United States Patent
Moulsley

(10) Patent No.: US 6,965,582 B1
(45) Date of Patent: Nov. 15, 2005

(54) CELLULAR RADIO COMMUNICATION SYSTEM

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/571,456

(22) Filed: May 16, 2000

(30) Foreign Application Priority Data

May 21, 1999 (GB) .................................... 9911738
Feb. 23, 2000 (GB) .................................... 0004126

(51) Int. Cl.$^7$ .......................... H04B 7/185; H04B 7/216
(52) U.S. Cl. ...................... 370/329; 370/335; 370/338; 370/478; 455/447
(58) Field of Search ................................ 370/276–278, 370/280–281, 244, 245, 310, 328, 338, 342, 370/350, 431, 437, 441, 444, 458, 459, 460, 370/461, 478, 480, 537, 538, 319, 321, 322, 370/329, 335, 337, 341, 345, 443, 463, 479; 455/434, 450, 447

(56) References Cited

U.S. PATENT DOCUMENTS

| | | | | |
|---|---|---|---|---|
| 5,038,399 A | * | 8/1991 | Bruckert | 455/447 |
| 5,581,548 A | * | 12/1996 | Ugland et al. | 370/330 |
| 5,844,894 A | * | 12/1998 | Dent | 370/330 |
| 5,946,625 A | * | 8/1999 | Hassan et al. | 455/447 |
| 6,078,815 A | * | 6/2000 | Edwards | 455/450 |
| 6,137,787 A | * | 10/2000 | Chawla et al. | 370/337 |
| 6,262,980 B1 | * | 7/2001 | Leung et al. | 370/336 |

* cited by examiner

*Primary Examiner*—Afsar Qureshi
(74) *Attorney, Agent, or Firm*—Dicran Halajian

(57) ABSTRACT

A cellular radio communication system operating in accordance with a time division multiple access protocol assigns different fractional loading factors to different time slots. As a result, as well as because of the effects of local propagation conditions, different time slots will have different interference levels. A mobile station in a worst-case propagation environment (such as near the edge of a cell or when subject to severe shadowing fading) can be assigned a time slot having a low interference level, while a mobile station in a good propagation environment can be assigned a time slot having a higher interference level.

7 Claims, 2 Drawing Sheets

CELLULAR RADIO COMMUNICATION SYSTEM

The present invention relates to a cellular radio communication system having, or operating in accordance with, a time division multiple access protocol or component, and further relates to primary and secondary stations for use in the system and to a method of operating the system.

In a cellular radio communication system the area over which the system operates is subdivided into a plurality of cells, each defined by the coverage area of a Base Station (BS). Each BS may be coupled to system controller which co-ordinates the operation of the complete system, or the system control function may be distributed amongst the base stations. A Mobile Station (MS) engaged in a call communicates with the BS of the cell in which it is currently situated, this communication being over a radio channel according to a defined radio protocol. One such protocol, for example that on which the Global System for Mobile communication (GSM) and UMTS Time Division Duplex (TDD) standards are based, is multi-carrier Time Division Multiple Access (TDMA). According to this protocol communication takes place in allocated time slots defined on a plurality of carrier frequencies.

Many cellular radio communication systems, for example those operating to the GSM standard, employ the concept of frequency re-use, in which a particular carrier frequency used in one cell is re-used in other cells according to some repeating pattern. The re-use factor for a system is defined as the total number of carrier frequencies used by the system divided by the number of carriers available for use in any one cell. With a small re-use factor there is a large number of frequencies available in each cell, but the system is limited by interference due to the low re-use factor (because the same frequency may be in use in a nearby cell). With a high re-use factor the number of users in the system is limited by the smaller number of available channels in each cell.

A major problem with such systems is that of providing a communication link to a MS under worst-case propagation conditions, where the interference is high and the power received by the MS is low. Such conditions may arise, for example, when the MS is located near to a cell boundary, or when it is subject to severe shadowing fading. The choice of re-use factor is therefore generally a compromise between spectrum efficiency (and therefore system capacity) and meeting the worst-case requirements.

A number of more sophisticated cell designs and re-use patterns have been proposed to improve system capacity. Examples include:

Annular cell structure. A MS close to its BS uses different carrier frequencies from those used by a MS distant from its BS. Such a scheme is suitable for both Code Division Multiple Access (CDMA) and Time Division Multiple Access (TDMA) systems. This scheme has the disadvantage that additional carrier frequencies are required to be allocated to the system.

Multiple re-use pattern. In this scheme different sets of carriers have different re-use patterns, with some carrier frequencies being re-used more often than others. This scheme is suitable for TDMA systems using frequency hopping, for example GSM, and improves interference diversity. This is because if a MS is suffering too high a level of interference it can hop to a different carrier frequency, and if this carrier has a different re-use pattern from the first then the interference level will be different too, and is likely to be reduced. This scheme has the disadvantage that it only reduces the general level of interference, and the reduction may not be sufficient to handle worst-case connections.

Fractional loading. This scheme is also applicable to a TDMA system using frequency hopping. Only a limited fraction (the fractional loading factor) of time and frequency slots are allocated, usually on a random basis. Reducing the fractional loading factor reduces average interference levels, and allows a smaller re-use factor. Admission control (the process which makes a decision on whether a requested connection is set up, which process may be centralized) ensures that the maximum load is not exceeded. This scheme also has the disadvantage that it only reduces the general level of interference.

An object of the present invention is to make better use of the system capacity while avoiding the above disadvantages.

According to a first aspect of the present invention there is provided a cellular radio communication system comprising a primary station and a plurality of secondary stations, the system operating according to a time division multiple access protocol in which transmissions between primary and secondary stations take place in time slots within transmission frames, wherein different time slots have different fractional loading factors.

Time slots having different fractional loading factors will have different interference levels. Thus a call can be assigned to a time slot on the basis that the carrier to interference ratio is adequate to meet the required quality of service, for example a time slot having a low interference level can be allocated to a worst-case connection and vice versa, thereby enabling system capacity to be optimized.

According to a second aspect of the present invention there is provided a primary station for use in a cellular radio communication system operating according to a time division multiple access protocol in which transmissions between primary and secondary stations take place in time slots within transmission frames, wherein means are provided for applying different fractional loading factors to different time slots.

According to a third aspect of the present invention there is provided a secondary station for use in a cellular radio communication system operating according to a time division multiple access protocol in which transmissions between primary and secondary stations take place in time slots within transmission frames, wherein means are provided for determining the interference level in different time slots and for requesting a connection to be assigned to the time slot having the worst carrier to interference ratio that enables the quality of service required for the call to be provided.

According to a fourth aspect of the present invention there is provided a method of operating a cellular radio communication system, the system comprising a primary station and a plurality of secondary stations and operating according to a time division multiple access protocol in which transmissions between primary and secondary stations take place in time slots within transmission frames, wherein different fractional loading factors are applied to different time slots.

The present invention is based upon the recognition, not present in the prior art, that different time slots in a transmission frame can advantageously have different fractional loading factors.

Embodiments of the present invention will now be described, by way of example, with reference to the accompanying drawings, wherein.

DETAILED DESCRIPTION OF THE INVENTION

Figure 1:
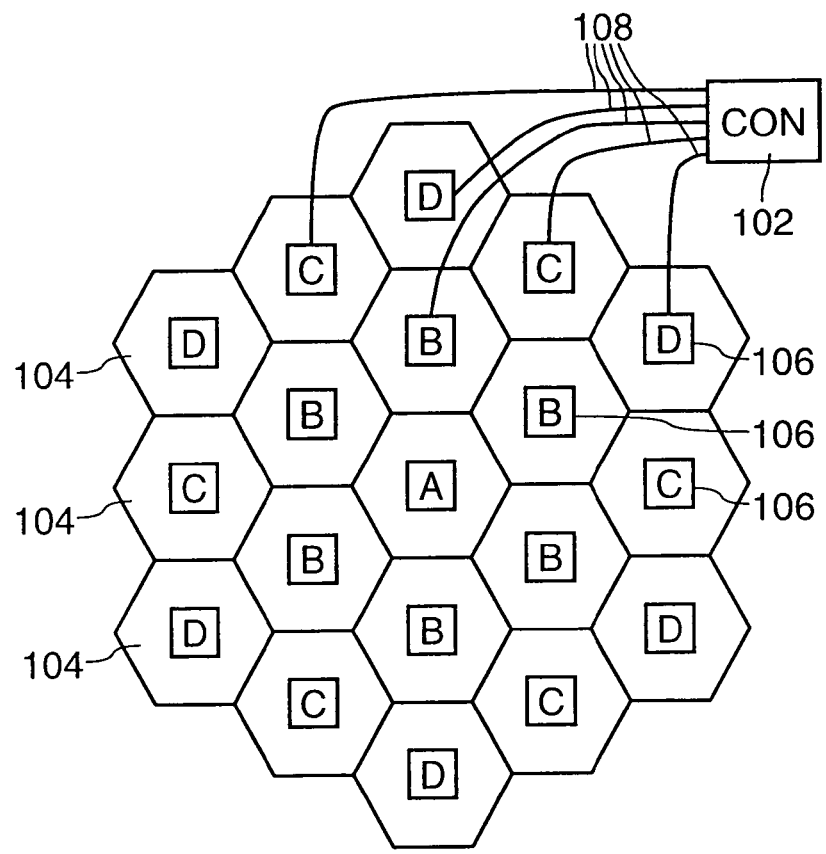
FIG. 1 is a diagram of part of a cellular radio communication system.

Part of a cellular radio communication system is shown in FIG. 1 and comprises a central controller (CON) 102 and a plurality of cells 104. Each cell includes a primary station (BS) 106 (labelled A to D) which may be located at the centre of a cell with an omnidirectional transmission pattern, or at a corner of the cell with a directional transmission pattern. Although the cells 104 are shown as having a hexagonal shape, in practice their shape may not be so regular and will depend on the local radio environment in each cell. Also it is not necessary for all the cells 104 to be the same size. In fact the size of cells is often varied to cater for differing traffic demands in different locations.

The controller 102 is connected to each BS by connection means 108, which may for example comprise land line connection means or radio connection means. The controller 102 co-ordinates the operation of the complete system, for example performing any necessary co-ordination and synchronization tasks. In some systems the function of the controller 102 may be distributed, for example among a plurality of primary stations 106. In a system in accordance with the present invention the controller 102 may store information about the fractional loading and re-use factors for respective channels and time slots, which information can be updated. Connection to the PSTN or other suitable network may take place via the controller 102 or each BS 106 may have its own connection.

Figure 2:
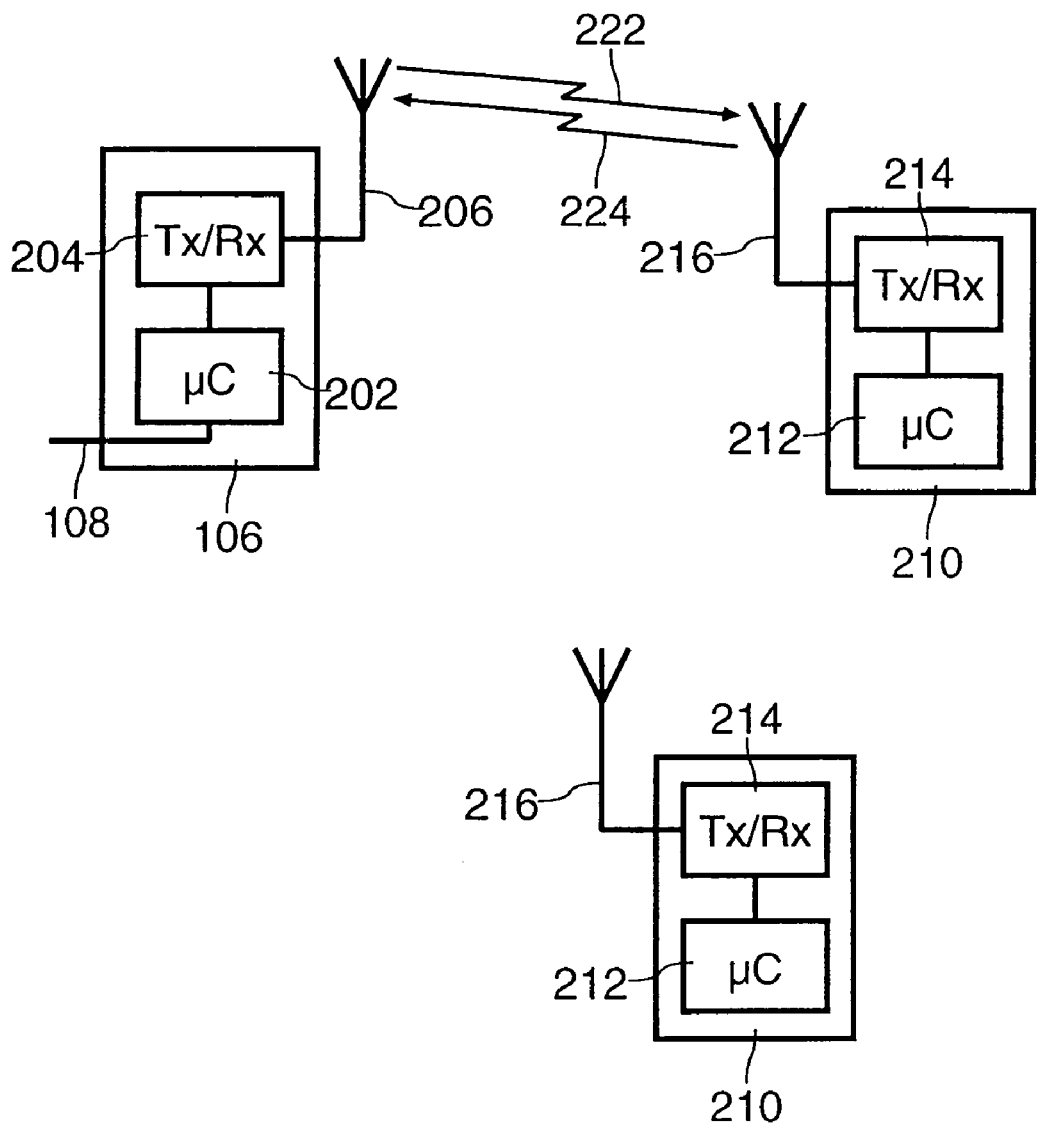
FIG. 2 is a block schematic diagram of one cell of a radio communication system.

An arrangement within a single cell of the above system is shown in FIG. 2 and comprises a BS 106 and a plurality of secondary stations (MS) 210. The BS 106 comprises a microcontroller ($\mu C$) 202, transceiver means 204 connected to radio transmission means 206, and connection means 108 for connection to the central controller 102. Each MS 210 comprises a microcontroller ($\mu C$) 212 and transceiver means 214 connected to radio transmission means 216. Communication from BS 106 to MS 210 takes place on a downlink channel 222, while communication from MS 210 to BS 106 takes place on an uplink channel 224.

Figure 3:
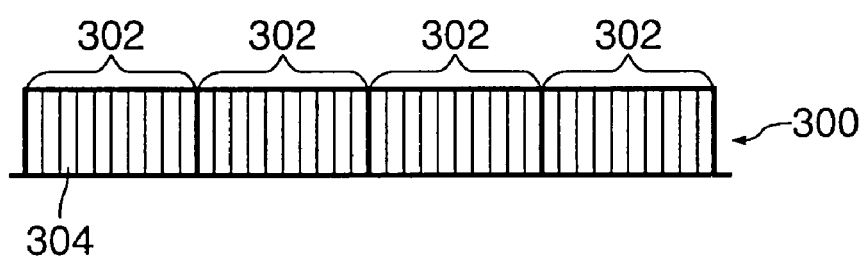
FIG. 3 illustrates the subdivision of a radio channel into frames and time slots.

The present invention is further concerned with such a cellular radio communication system operating according to a single or multi-carrier TDMA protocol. An arrangement of a radio channel for such a system is illustrated in FIG. 3. The radio channel 300 is divided into a succession of frames 302. Each frame 302 is further subdivided into a plurality of time slots 304 in which communication between BS 106 and MS 210 can take place. The radio channel 300 may be shared between downlink 222 and uplink 224 channels, or may be dedicated to either downlink or uplink communication.

In a system in accordance with the present invention, each time slot 304 may have a different fractional loading factor and hence a different re-use factor. For example, the first time slot 304 in each frame 302 could have a small fractional loading factor (and hence low re-use factor) while the second time slot 304 could have a high fractional loading factor (and hence a high re-use factor). Information on the fractional loading and re-use factors is stored in the system controller 102.

To ensure a different average interference level for each time slot frequency hopping (or equivalently time slot hopping) can be used. It is not necessary for there to be explicit co-ordination between primary stations 106. However if the primary stations 106 are synchronized, via the controller 102, the same time slot to fractional loading assignment can be used by each BS 106. Without synchronization between primary stations 106 the loading of each slot should be measured, by determining the interference level.

The application of different fractional loading factors to different time slots further enables the application of different re-use factors to different time slots. Hence, each time slot has its own re-use pattern which could be allocated in a coordinated way between primary stations 106 by the controller 102, or alternatively by the use of dynamic channel allocation techniques to select a time slot having a sufficiently low interference level for each radio link. Frequency hopping is not required because the averaging of interference levels that it produces is not necessary in a system according to the present invention.

Referring to FIG. 1, consider the time slots used by the BS 106 labelled A. Only those time slots with low fractional loading and a re-use factor of 1 will also be used by the primary stations 106 labelled B. Time slots with higher fractional loading and lower re-use factors will be re-used by the primary stations 106 labelled C and D.

In order to exploit properly the use of different fractional loading and re-use factors in different time slots, the assignment of a call to a time slot should be carried out such that the carrier to interference ratio in the selected time slot is no better than is necessary to meet the required quality of service for the call. This ensures that time slots with low interference levels are available to a MS 210 having a worst-case propagation path to its wanted BS 106. This is in contrast to systems such as Digital Enhanced Cordless Telecommunications (DECT) where a new call is assigned to the available slot having the lowest interference level, even if this provides a much better carrier to interference ratio than is required for a successful call.

In some applications, for example those having a requirement for a minimum quality of service, it may be necessary to asses the likely quality of a particular call to time slot assignment. In general this would require a knowledge of the current interference level for each time slot, and the available carrier signal levels (which depend on propagation conditions and transmitter power output). Such information is easy to obtain in typical mobile radio systems: the transmission power of a BS 106 is known (and broadcast) while the interference levels can be measured by the MS 210.

Figure 4:
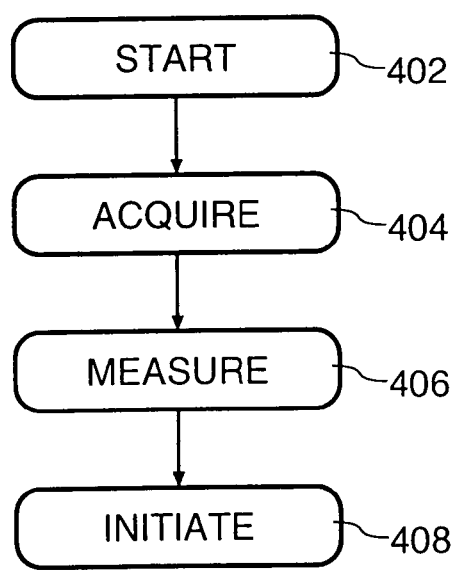
FIG. 4 is a flow chart illustrating a method in accordance with the present invention for initiating a call.

A method in accordance with the present invention for a MS 210 initiating a call is illustrated in FIG. 4. The method starts, at 402, when the MS 210 wishes to make a call. Next, at 404, the MS 210 acquires a broadcast signal from a BS 106 in order to synchronise with its transmissions. The MS 210 can then measure, at 406, the carrier to interference ratios in available time slots. In general there will be a number of time slots available with a range of carrier to interference ratios. By selecting a time slot having a carrier to interference ratio just sufficient for the required quality of service, time slots having better characteristics are left for use by a MS 210 in a poorer propagation environment. Hence it is preferred that the MS 210 requests, at 408, the BS 106 to initiate a connection in the time slot having the worst carrier to interference ratio that enables the quality of service required for the call to be provided.

A major advantage of a system in accordance with the present invention is that it is not necessary to provide additional carrier frequencies in order to provide additional re-use patterns with high re-use factors. This means that the quality of service and/or capacity of an already-deployed TDMA system can be improved without requiring any hardware changes.

If the data rates on uplink and downlink connections are different, then in general this will give rise to different loading factors on the uplink and downlink. Furthermore, for both symmetric and asymmetric traffic in uplink and downlink, provided that the uplink and downlink slots can be assigned independently, the loading factor between the various time slots can be organized differently on the uplink and downlink to maximize system capacity.

The present invention is applicable in principle to any radio system having a TDMA component, including GSM, DECT, UMTS and IMT2000 (although the channel assignment mechanism currently defined for DECT prevents exploitation of some aspects of the invention, as indicated above). It is equally applicable to uplink and downlink transmissions.

In an application such as the UMTS TDD mode, in which CDMA techniques are used, fractional loading can be implemented simply by the assignment of more spreading codes to some time slots than to others. In addition the loading could be adjusted by changing the spreading factor of the assigned codes, with higher loading corresponding to a lower spreading factor. In such a CDMA system, further flexibility in allocation of resources is possible. For example, a call could be assigned to the time slot with the best carrier to interference ratio, provided this did not exceed the desired loading factor for that slot. Synchronization between adjacent cells would be desirable, but not essential for a CDMA-TDD system. Further, although not required either or both of frequency hopping and time-slot hopping could be employed.

From reading the present disclosure, other modifications will be apparent to persons skilled in the art. Such modifications may involve other features which are already known in cellular radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A cellular radio communication system, comprising:
   a primary station; and
   a plurality of secondary stations,
   wherein the system operates according to a time division multiple access protocol in which transmissions between said primary station and said secondary stations take place in time slots within transmission frames,
   wherein different time slots have different fractional loading factors; and
   wherein a call is assigned to a first time slot having a worst carrier to interference ratio that enables a quality of service required for the call to be provided.

2. The cellular radio communication system of claim 1, wherein the system operates according to a code division multiple access protocol and in that the different fractional loading factors are implemented by assigning different numbers of spreading codes to different time slots.

3. A primary station for use in a cellular radio communication system, said primary station comprising:
   means for operating according to a time division multiple access protocol in which transmissions between said primary station and a plurality of secondary stations take place in time slots within transmission frames;
   means for applying different fractional loading factors to different time slots; and
   means for determining an interference level in different time slots and for assigning a call to a first time slot having a worst carrier to interference ratio that enables a quality of service required for the call to be provided.

4. The primary station of claim 3,
   wherein the system operates according to a code division multiple access protocol; and
   wherein said primary station further comprises means for assigning different numbers of spreading codes to different time slots.

5. A secondary station for use in a cellular radio communication system, said secondary station comprising:
   means for operating according to a time division multiple access protocol in which transmissions between a primary station and said secondary station take place in time slots within transmission frames, wherein different fractional loading factors are applied to different time slots; and
   means for determining the interference level in different time slots and for requesting a connection to be assigned to a first time slot having a worst carrier to interference ratio that enables a quality of service required for the call to be provided.

6. A method of operating a cellular radio communication system including a primary station and a plurality of secondary stations, the method comprising:
   operating the system according to a time division multiple access protocol in which transmissions between the primary station and the secondary stations take place in time slots within transmission frames;
   applying different fractional loading factors to different time slots; and
   assigning a call to a first time slot having a worst carrier to interference ratio that enables a quality of service required for the call to be provided.

7. The method of claim 6, further comprising:
   operating the system according to a code division multiple access protocol; and
   assigning different numbers of spreading codes to different time slots.

* * * * *